United States Patent [19]

McIntosh

[11] Patent Number: 5,904,292
[45] Date of Patent: May 18, 1999

[54] MODULATING FLUID CONTROL DEVICE

[76] Inventor: Douglas S. McIntosh, 100 Drayton Road, Pointe Claire, Quebec, Canada, H9S 4V9

[21] Appl. No.: 08/760,685

[22] Filed: Dec. 4, 1996

[51] Int. Cl.[6] .............................. F28F 27/00; G05D 15/00
[52] U.S. Cl. ............................. 236/37; 165/295; 165/297
[58] Field of Search .................................... 165/295, 297, 165/293; 236/37, 25 R, 36; 137/625, 29

[56] References Cited

U.S. PATENT DOCUMENTS

| | | | |
|---|---|---|---|
| 2,252,142 | 8/1941 | Simon | 236/37 |
| 3,503,422 | 3/1970 | Lanzoni | 137/625.29 |
| 4,583,683 | 4/1986 | Adachi | 165/295 |
| 5,363,905 | 11/1994 | Rhiel et al. | 165/295 |

*Primary Examiner*—William Wayner
*Attorney, Agent, or Firm*—McAulay Nissen Goldberg Kiel & Hand, LLP

[57] ABSTRACT

The present invention relates to a modulating fluid control device for a fluid-based heating and cooling system for a measured environment. The control device comprises a body, a fluid entry port and a fluid exit port and a valve with actuator located between the ports. In the case of three-way valves a bypass port is also provided thus becoming a mixing or diverting valve. The valve is responsive to input from a sensor and controller to restrict or permit the flow of fluid through the valve dependent upon conditions in the measured environment. The improvement is characterized in that the control device is provided with: (a) a valve controller and means associated therewith to position the valve and thereby regulate the flow of fluid through that valve, and (b) flow detection means associated with the valve to measure the flow of fluid at a location in the system and provide to the valve controller a feedback signal representative of that flow rate. The sensor and controller is adapted to provide a signal to the valve controller and the valve controller is arranged to control the valve, and so control the flow of fluid in the system responsive to signals received from the sensor and controller. The flow detection means and the valve controller are arranged to maintain a required rate of flow of fluid through the system as measured by the flow detection means, which promotes desired environmental conditions in the measured space.

21 Claims, 2 Drawing Sheets

MODULATING FLUID CONTROL DEVICE

FIELD OF THE INVENTION

The present invention relates to a modulating fluid control device for fluid based heating and cooling systems, and more particularly relates to a smart control valve for such systems.

BACKGROUND OF THE INVENTION

Heating or cooling of a thermal load such as a space in a building, a process, an energy distribution system, etcetera, is currently controlled and/or monitored by up to three separate instruments, including (1) a control valve which modulates the amount of flow through the heat exchange device to the demands of a thermostat (2) an adjustable restrictor valve to balance the system by restricting the maximum flow in that leg, and (3) a BTU meter to monitor the amount of energy being used.

(1) Control Valves:

The current range of control valves, modulated or regulated from the thermostat, effectively drive the actuating stem of the valve to a given height or degree of rotation. Such control valves utilize feedback systems related to the stem position and/or its movement, to indicate stem position to the thermostat, thus balancing the feedback circuit. Considerable refinements have been made with parabolic shaped plugs or triangular slots to approximate the position of the stem relative to the amount of flow, however, changes in differential pressures defeat the accuracy of these complex machined restricting shapes, the control valves being subject to changing differential pressures, or pressure dependent. Furthermore, flow is not always relative to actual BTU's pumped, dependent also on differential temperature taken across the heat exchanger, thus limiting the accuracy of the control valve further.

(2) System Balancing Valves:

The current balancing valves are simple restriction valves adjusted to restrict the maximum flow and they require accurate and time consuming setup adjustment, and an accurate flow measuring instrument, of which there are many types, but again, as the system differential pressures change because of changing loads in other parts of the fluid flow system, so the accuracy of the measurement is affected in that these restrictor balancing valves as they too are pressure dependent.

(3) BTU Meters:

The current trend in BTU measurement is a matter of measuring flow multiplied by inlet temperature less outlet temperature all times a constant and BTU meters therefore consists of a flowmeter mounted in the fluid pipe, and two temperature probes one for the supply water and the other for the return water from the heat exchanger. While quite accurate, these devices are costly, leading to the use of substitute and inaccurate compromises.

It is thus the object of the present invention to provide a more efficient and effective, as well as less costly approach to temperature and energy management in buildings, in energy distribution networks, and in process control systems wherever temperature transmission is involved.

It is a further object of the present invention to incorporate an accurate flowmeter within a control valve, to provide modulating feedback directly from this flowmeter rather than from the valve stem position. In a preferred embodiment of the invention it is a further object to provide temperature measuring taps for supply and return fluid so effectively providing all three instruments in one pressure independent control valve/balancing valve/BTU meter for little additional cost to that of a simple control valve.

SUMMARY OF THE INVENTION

The present invention relates to a fluid control device for a fluid-based heating and cooling system for a measured environment. The fluid control device is of the type which comprises a valve body, a fluid entry port and a fluid exit port and a valve with actuator located between the ports. In the case of three-way valves a bypass port is also provided thus becoming a mixing or diverting valve. The valve is responsive to input from a thermostat to restrict or permit the flow of fluid through the valve dependent upon conditions in the measured environment. In accordance with the invention the fluid control device has a valve controller (e.g. PIC) and means associated therewith to position the valve and thereby regulate the flow of fluid through that valve. A flow detection means is associated with the valve to measure the flow of fluid at a location in the system and provide to the valve controller a feedback signal representative of that flow rate. The thermostat is adapted to provide signals to the valve controller (e.g. PIC) and the valve controller is arranged to control the valve, and thereby control the flow of fluid in the system responsive to those signals. The flow detection means and the valve controller are arranged to maintain a required rate of flow of fluid through the system as measured by the flow detection means, which promotes desired environmental conditions in the measured space.

In a preferred embodiment of the present invention the fluid control device further comprises a pair of temperature sensors. The first one of the sensors is positioned to measure the temperatures of the fluid passing to the heat exchanger. The second of the sensors is positioned to measure the temperature of fluid leaving the heat exchanger. Each sensor provides a signal representative of the temperature of the fluid at the respective sensor's location. The valve controller is arranged to calculate the BTU gain or loss in the fluid between the sensors and control the valve to provide a desired flow of BTU's responsive to those calculations. The BTU loss or gain can be calculated knowing the flow, and this BTU (calorie) figure used as the feedback instead of stem height or simple flow for accurate control of the actual BTU's delivered at a given time, for efficiency, for energy monitoring and for billing purposes.

While an analog electronic or pneumatic controller would perform these tasks, it is a further preferred embodiment of the present invention that the valve controller be a programmable integrated controller (PIC) adapted to receive signals from the sensor(s) and flow detection means, and programmed to control the valve responsive to signals received from the sensor(s) and the flow detection means.

Depending upon the heat transfer fluid (air, water, glycol, oil, etcetera), the valve mechanics may be two ported, three ported, or four ported, but whatever, an internal flowmeter will measure and act as feedback, and the valve motorized pneumatically or electrically so as to close enough to regulate the flow to and/or from the heat exchange device being controlled for the measured environment. No stem position feedback is needed, since it is the flow that is monitored, the position of the stem being irrelevant.

The multiple instrument of the present invention may also incorporate temperature taps where BTU measurement is required, and may incorporate a programmable integrated controller or use a building automation system computer or other pneumatic or electric/electronic relay logic devices to compute flow and/or BTU's, etcetera.

In air conditioning or cooling systems, total heat sensors may also be required in order to accurately measure both latent as well as sensible heat, these sensors replacing or augmenting the temperature sensors.

The advantages of these instruments become most apparent when used in conjunction with building automation systems where comfort and energy management can now be accurately measured and controlled. Furthermore system balancing can now be done from the building management system front end (operator's console) more accurately. As well the use of a pressure independent control device offers energy savings for both fuel costs, and system fluid pumping costs.

Without any additional installation, with only one instrument to install, two instruments are made redundant, the additional software costs being far outweighed by the capital expenses saved and the running costs saved.

BRIEF DESCRIPTION OF THE DRAWINGS

These and other advantages of the invention will become apparent upon reading the following detailed description and upon referring to the drawings in which.

Figure 1:
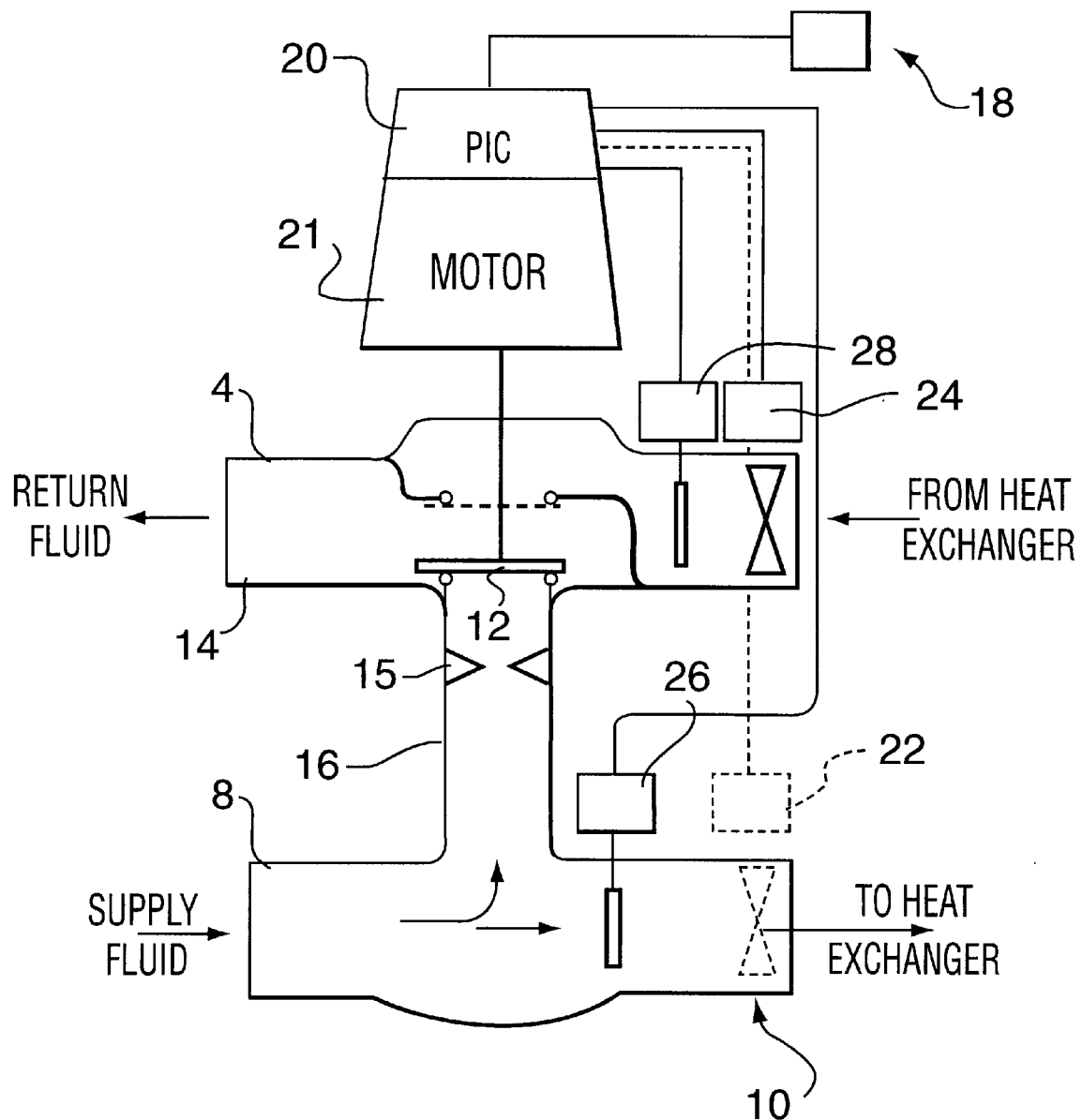
FIG. 1 is a schematic side view of a four port three-way control valve in accordance with the present invention, incorporating two temperature sensors, a flow detector, a room thermostat, a programmable integrated controller (PIC), ports to and from the heat exchanger or load, and ports from and to the fluid supply and return.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to FIG. 1, there is illustrated a fluid control device 2 for a water-based heating or cooling system in accordance with the present invention. In particular, a conventional three-way four port valve 4 is provided, having a body 6 which forms a fluid entry port 8 to the controlling valve plug 12, and a fluid exit port 10 to the heat exchanger (not shown). Fluid returning from the heat exchanger enters port 13 and returns through port 14 back to the heating or cooling unit (not shown). The valve plug 12 is movable between open position (as illustrated), allowing fluid to pass from entry port 8 through port 10 to the heat exchanger for the space in question, and back through port 13 and port 14, or closed position (in phantom) blocking that passage but permitting the fluid flow from entry port 8 directly through restriction 15 and passage 16 to and through teed exit port 14, without passing through the heat exchanger, and positions between these two in which some fluid is diverted in each direction, the return from the heat exchanger mixing in teed port 14. A similar type of three-way valve known as a directing valve may be arranged to mix the water on the supply; thus the diverting is done in a teed port on the supply with all flows reversed from those shown in FIG. 1, but the principle remains the same.

The positioning of valve plug 12 is responsive to the temperature desired at the heat exchanger as dictated by a thermostat 18, and the required temperature to be maintained in the vicinity of that exchanger. Thermostat 18 may alternatively or additionally be a humidistat and may be a sensor and controller.

A programmable integrated controller (PIC) 20 is associated with valve plug 12, as illustrated. PIC 20 is adapted to control valve motor 21 to position valve plug 12 and thereby regulate the flow of fluid to the exchanger for the space through port 10 or exit port 14. While, in the illustrated embodiment, the PIC 20 is directly associated with motor 21 for valve 12, a computer or microprocessor remote therefrom, for instance in a building systems' management office, might be used. A flow detector 22 is provided as illustrated in phantom, at port 10, to detect flow rates of fluid from entry port 10 to the heater or cooler and is associated with the PIC to provide thereto an electronic feedback signal representative of that flow rate. It should be noted that though detector 22 measures heat exchanger flow, that can be measured on either supply or return fluid port. In the illustrated embodiment, an alternative flow detector 24 may be provided in the vicinity of port 13 to alternatively detect the rate of fluid flow entering valve 4 from the heat exchanger. Either flow detector could measure flow through the heat exchanger. PIC 20 is electronically associated with motor 21, and programmed, to control the rate of flow of fluid as detected by either detector 22 or 24, to appropriately position valve plug 12 as commanded by thermostat 18 or maximum programmed flow as per water system balancing requirements.

A pair of temperature sensors 26 and 28 is also provided, sensor 26 being positioned within the frame of valve 4 in the vicinity of the exit port 10 and sensor 28 being positioned in the vicinity of fluid leaving the heat exchanger, i.e. near port 13. These sensors are electronically associated with the PIC to provide electronic signals representative of the temperature of the water at the respective sensor's location.

The PIC is programmed, in the illustrated embodiment, to control the valve responsive to signals received from thermostat 18 and the flow detector 22, so as to provide a flow of water through the valve plug 12, which promotes thermostat-dictated temperature conditions in the space and flow valve-dictated maximums for water balancing. As well, the PIC is programmed to calculate the BTU gain or loss in the fluid between the sensors and control the valve to provide a desired flow of fluid responsive to those calculations while monitoring and/or totalizing BTU's for billing and efficiency.

It will be understood, with respect to the fluid control means of FIG. 1, that in some instances it will not be necessary to calculate BTU gain or loss in the water and that, in those instances, detectors 26 and 28 will not be necessary.

The control device 2 of FIG. 1, by providing a feedback signal to PIC 20 taken from flow detector 22 (or alternatively from flow detector 24), rather than feedback from a mechanical linkage taken from the stem position of valve plug 12, drives valve plug 12 to an actual delivered flow rate instead of modulating the valve to a given stem position (drive stem up, stem down, half-way, etcetera). Thus the rate of flow will be maintained regardless of changes in system differential pressures.

When the control device is set up to calculate BTU gain or loss in the water using detectors 26 and 28, an actual BTU rate (e.g. deliver 150 BTU's per minute) can be controlled, with resulting increase in accuracy. This accuracy is maintained regardless of changes in fluid system differential pressures and also accounts for any change of temperature in both supply and return fluid.

Figure 2:
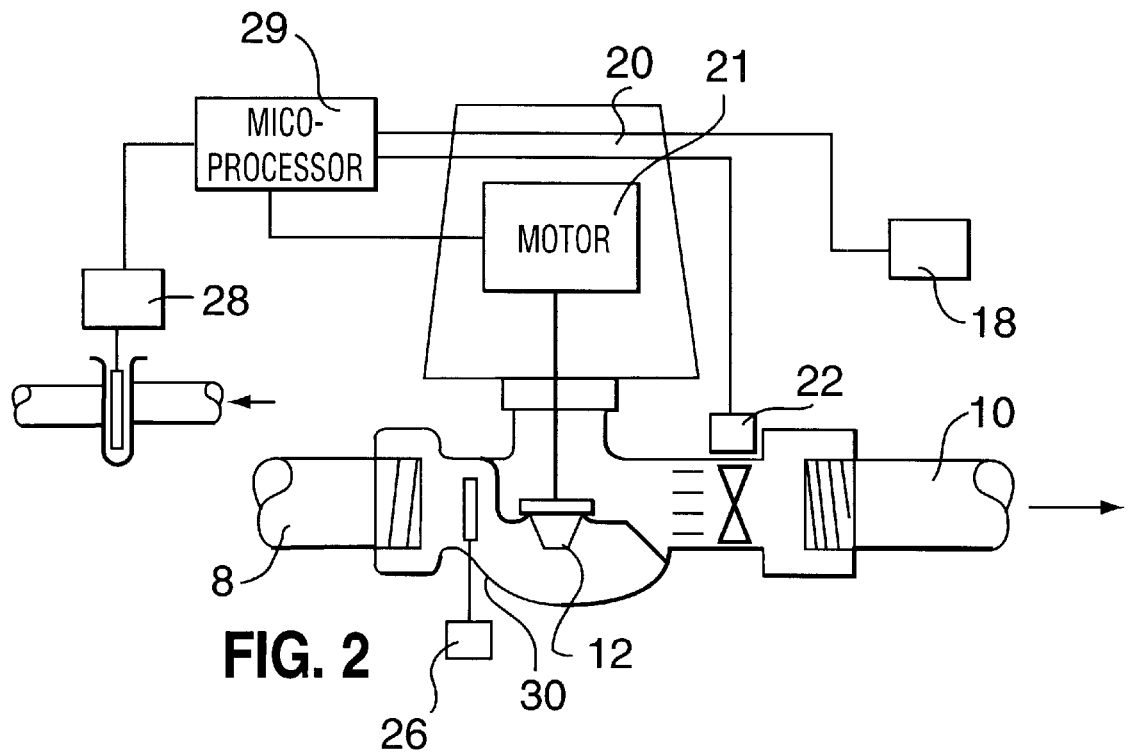
FIG. 2 is a schematic side view of a two port two-way globe valve in accordance with the present invention, adapted to incorporate a fluid flow sensor and single temperature sensor, the second sensor having to be located in the piping external to the valve.

Turning to FIG. 2, there is illustrated a remote computer 29 (positioned for example in a building system's control room), associated with a motor 21 which positions valve plug 12 of a conventional globe valve 30 in a water-based heating system. (Globe valve 30 might alternatively be a butterfly valve, paddle valve, gate valve, ball valve, or any other type of conventional valve which suits the need). Valve 30 is positioned in the supply line for water to the space to be heated, and has associated with it a flow detector 22, between inlet port 8 and exit port 10 as illustrated. Flow meter 22 transmits an electronic signal to computer 29 proportional to the flow of water through the supply line and the computer is programmed to control the positioning of valve plug 12, and hence the rate of flow through it, in accordance with temperature conditions in the space to be heated as indicated by thermostat 18 and/or water balancing maximum flow requirements. In two pipe arrangements such as this, when BTU measurement is needed, a separately mounted temperature sensor in the return from the heat exchanger must be installed so as to work with temperature sensor 26 and flow sensor 22 to calculate BTU's.

Figure 3:
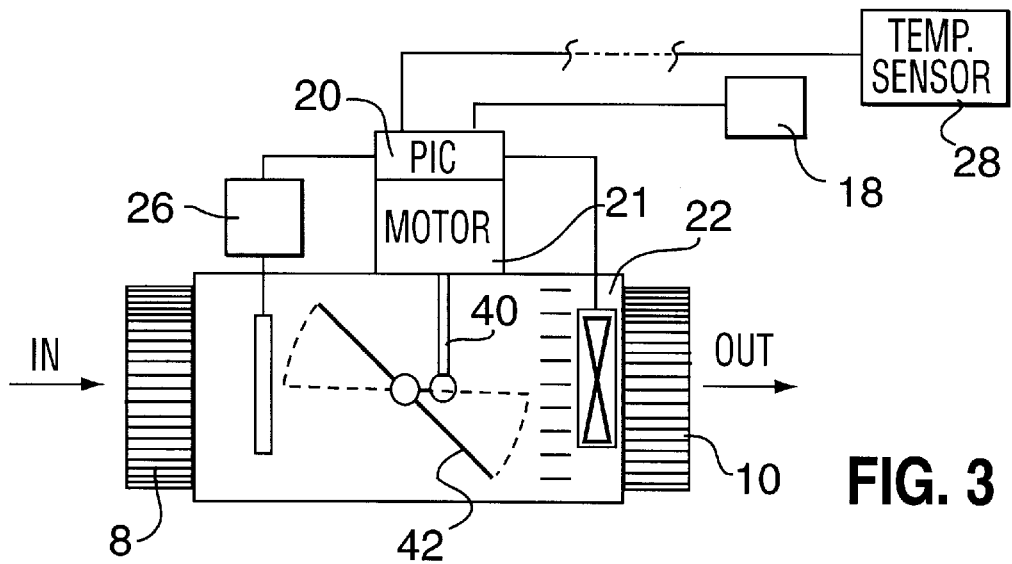
FIG. 3 is a schematic side view of a fluid control device in accordance with the present invention adapted to a variable air volume (VAV) control valve for a variable air volume system.

The fluid control device of the present invention may be similarly adapted to a variable air volume system, as illustrated in FIG. 3. PIC 20 is associated with and governs the operation of motor 21 dependent on signals received from temperature and/or total heat detector 26 positioned to sense the temperature (or total heat in cooling applications) of incoming air and temperature or total heat detector 28 appropriately positioned to detect the temperature or total heat of air in the space being heated or cooled, probably within the room sensor/thermostat 18, and air flow detector 22 positioned between entry port 8 and port 10 as illustrated. Gear motor 21 moves a rod 40 which controls the positioning of baffle 42 as illustrated. Air leaving outlet 10 is passed to a diffuser or grill in the space to be heated or cooled.

In general, the fluid control means of the present invention enables the valve to act as both a control valve from a thermostat and as a maximum flow controller to enable balancing of the air or water heating/cooling system. The flow detector provides a reading of flow of fluid through the valve. For use in system water or air balancing, the devices of FIGS. 1, 2 and 3 can be programmed to or limited to a maximum flow rate, limiting the maximum flow. The control valves then becomes very much improved balancing valves since they limit the flow accurately, as opposed to theoretically, to actual rate of flow as measured by the flow detector. Furthermore, whereas the duplication of control valve and balancing valve in conventional systems has caused occasional noise through harmonics, the improved control device according to the present invention reduces costs by avoiding this duplication, saves on labor involved in water balancing (since it can now be done from the keyboard or front end of a computer-based building automation system) and results in energy savings through reduction and greater efficiency of fluid pumping.

From the embodiments illustrated in FIGS. 1, 2 and 3, it will be readily understood that the present invention provides a three-in-one instrument which can function not only as a control valve, but also as a BTU meter and a system balancing valve. This one component:

controls temperature (or humidity, etcetera)

modulates with tremendous precision, controlling steady output even with fluctuating inlet temperatures or variable differential pressures (i.e. it is pressure independent)

transmits supply and return temperatures transmits rate of fluid flow calculates and transmit BTU's accumulates BTU's over a given time costs little more than a standard modulating control valve The device according to the present invention provides a control valve with much greater accuracy since it uses an accurate flow meter as feedback, not a stem height sensor as in previously known devices. It can therefore not only transmit rate of flow but can hold and deliver an accurate rate of flow.

With the addition of temperature sensors and logic, the device according to the present invention can have as its feedback, the actual BTU's of heat rather than stem height. It can therefore not only transmit the BTU rate of flow, but can hold and deliver an accurate rate of flow of BTU's for tremendous precision.

The device according to the present invention can be limited to given maximum flow or minimum differential temperature across the controlled heat exchanger to provide system balancing with greater accuracy, thus saving fluid pumping energy while assuring adequate distribution at all points in a hydronic system.

In the embodiment of FIG. 3, using variable air volume for heating and air conditioning, the device according to the present invention can respond in a similar fashion, using one room and one discharge total heat sensor (sensible and latent heat) and one air flow sensor to provide all the features described above. Additionally, when used with total heat sensors instead of temperature sensors on cooling applications, it can calculate both sensible and latent heat gain or loss.

Thus in accordance with the present invention, it will be readily understood that thermostatic valve control, water balancing restrictor valve control and BTU metering/controlling functions can be provided in a single unit. This allows a building management company to control the temperature as normal, to limit the water flow so as to balance the heating/cooling system, and to monitor both flow and BTU's accurately for billing and/or record keeping, all from the same computer and registered on the same monitor and/or printer. In this way, one trade (the building management trade for example) can accomplish all three functions at little additional cost to their temperature control installation costs, and in a far more efficient, accurate and simple manner. The valve control device according to the present invention may be used singly, as in single dwellings, or in multiple applications so as to enhance the performance of building energy management systems, energy distribution installations, process control systems and the like.

The use of a flow detector in the present invention enables actual flow measurement to be made regardless of differential pressure on the fluid supply lines. Unlike present systems, where the controlling thermostat opens or closes a valve a predetermined degree, not taking into account the fluid inlet or air temperature, BTU's transferred, and the like, the fluid control means of the present system may measure both flow and BTU loss or gain (heating or cooling). The software in the PIC enables the positioning of the valve to make up the exact BTU or calorie gain or loss required. As well, unlike present systems which require additional balancing valves, the fluid control means of the present invention incorporates the balancing function through the PIC operating on the valve in accordance with signals received from the flow detector.

The device according to the present invention could also contribute to energy saving, for example by use of the differential temperatures between the fluid supply and return to and from the heat exchanger, and by closing down the fluid pumped, assuring that until that fluid had lost adequate heat, the flow of fluid to the heat exchanger could be restricted with a consequent saving of fluid pumped. In this case, the feedback signals to the PIC could be from three sources, the flow and/or the temperature differential and/or the BTU's, all as measured by the onboard programmable microprocessor on the PIC or a circuit with suitable algorithms, or as measured and/or calculated by a central building automation or energy management system.

The fluid control device according to the present invention has many advantages over conventional control valves, including the elimination of the need for expensive parabolic plugs, the imparting of meaningful information giving flow through the valve rather than stem position, the providing of feedback in gallons per minute or liters per second or BTU's, etcetera, the ability to monitor BTU's for energy management and/or billing when used with the inlet and outlet temperature sensors, the saving of fluid pumping by assuring minimal differential temperature across heat exchangers, the provision of properly programmed maximum flow rates, providing system water balancing, and the providing for more accurate control than previously possible.

Thus, it is apparent that there has been provided in accordance with the invention a modulating fluid control device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a modulating fluid control device for a fluid-based heating and cooling system for a measured environment, the device comprising a valve body, a fluid entry port and a fluid exit port and a valve with actuator located between the ports, the valve responsive to input from a thermostat to restrict or permit the flow of fluid through the valve dependent upon conditions in the measured environment, the improvement characterized in that the control device is provided with:

a valve controller and means associated therewith to position the valve and thereby regulate the flow of fluid through said valve, and flow detection means associated with the valve to measure the flow of fluid at a location in the system and provide to the valve controller a feedback signal representative of that flow rate, the thermostat adapted to provide signals to the valve controller and the valve controller arranged to position the valve in response to said signals, and so control the flow of fluid in the system, the valve controller being responsive to said feedback signal from said flow detection means to maintain a rate of flow of fluid through the system up to a required maximum for fluid balancing of the system.

2. A device according to claim 1 wherein the valve controller is a programmable integrated controller (PIC) programmed to control the positioning of the valve responsive to signals received from the thermostat and the flow detection means to maintain the required rate of flow of fluid through the system.

3. A device according to claim 2 further comprising a pair of temperature sensors, a first one of the sensors positioned to measure the temperature of the fluid passing through the device to a heat exchanger and a second of the sensors positioned to measure the temperature of fluid returning from the heat exchanger, each sensor to provide to the PIC an electronic signal representative of the temperature of the fluid at the respective sensor's location and the flow detection means to provide a signal of the fluid rate of flow, the PIC programmed to calculate the BTU gain or loss in the fluid between the sensors and control the valve to provide a desired flow of fluid responsive to those calculations.

4. A control means according to claim 3 wherein the means comprises a three-way four port valve, through the entry port to pass fluid to go to the heat exchanger and through the exit port to pass return fluid from the heat exchanger.

5. A valve according to claim 4 further comprising a flow detector positioned in the vicinity of the entry port, the detector to provide to the PIC an electronic signal representative of the fluid flow rate at the detector's location.

6. A device according to claim 1 wherein the flow detection means comprises a flow detector positioned within the body.

7. A device according to claim 1 further comprising a pair of temperature sensors, a first one of the sensors positioned to measure the temperature of the fluid passing through the device to a heat exchanger and a second of the sensors positioned to measure the temperature of fluid returning from the heat exchanger, each sensor to provide to the valve controller a signal representative of the temperature of the fluid at the respective sensor's location and the flow detection means to provide a signal of the fluid rate of flow, the valve controller arranged to calculate the BTU gain or loss in the fluid between the sensors and control the valve to provide a desired flow of BTU's responsive to those calculations.

8. A control means according to claim 1 wherein the fluid is selected from the group consisting of air or liquid.

9. A control means according to claim 1 in combination with a sensor and controller selected from the group consisting of a thermostat and a humidistat.

10. A fluid control device comprising a body a first fluid entry port in said body to receive a flow of fluid a first fluid exit port in said body for the flow of fluid to a heat exchanger, and a second fluid entry port in said body to receive a flow of fluid from the heat exchanger;

a second fluid exit port in said body for the flow of fluid from said second flow entry port;

a valve plug in said body for movement between an open position allowing fluid to pass from said first fluid entry port through said first fluid exit port to said second fluid exit port and a closed position blocking passage of fluid from said second fluid entry port to said second fluid exit port while allowing passage of fluid from said first fluid entry port to said second fluid exit port;

a motor for moving said valve plug between said open and closed positions thereof;

a programmable integrated controller for activating said motor; and a flow detector at one of said first fluid exit port and said second fluid entry port to detect a flow rate of fluid therein, said flow detector being electronically connected to said controller to provide a feedback signal representative of said flow rate to said controller whereby said controller activates said motor to move said valve plug to control the fluid flow to said first fluid exit port.

11. A fluid control device as set forth in claim 10 which further comprises a thermostat for mounting in a remote location to sense a temperature thereat, said thermostat being electronically connected to said controller to activate said motor in response to signals received from said thermostat to move said valve plug to adjust the fluid flow to said first fluid exit port.

12. A fluid control device as set forth in claim 10 which further comprises a first temperature sensor at said first fluid exit port and electronically connected to said controller to provide a signal thereto representative of the temperature of fluid in said first fluid exit port and a second temperature sensor at said second fluid entry port and electronically connected to said controller to provide a signal thereto representative of the temperature of fluid in said second fluid entry port.

13. A fluid control device as set forth in claim 12 wherein said controller is programmed to calculate a heat change in the fluid between said temperature sensors.

14. A fluid control device as set forth in claim 10 further comprising a restrictor between said first fluid entry port and said plug valve to restrict a flow of fluid therebetween.

15. A fluid control device comprising;
   a body;
   a fluid entry port in said body to receive a flow of fluid;
   a fluid exit port in said body for the flow of fluid to a heat exchanger;
   a valve plug in said body for movement between an open position to allow fluid to pass from said entry port to said exit port and a closed position to block passage of fluid from said entry port to said exit port;
   a motor for moving said valve plug between said open and closed positions thereof and a programmable integrated controller for activating said motor;
   a thermostat for mounting in a remote location to sense a temperature thereat, said thermostat being electronically connected to said controller to activate said motor in response to signals received from said thermostat to move said valve plug; and
   a flow detector between said ports to detect a flow rate therebetween, said flow detector being electronically connected to said controller to provide a feedback signal representative of said flow rate to said controller whereby said controller activates said motor to move said valve plug to control the fluid flow to said first fluid exit port.

16. A fluid control device as set forth in claim 15 which further comprises a first temperature sensor at said first fluid exit port and electronically connected to said controller to provide a signal thereto representative of the temperature of fluid in said first fluid exit port and a temperature sensor at said fluid entry port and electronically connected to said controller to provide a signal thereto representative of the temperature of fluid in said second fluid entry port and wherein said controller is programmed to calculate a heat change in the fluid between said temperature sensors.

17. A fluid control device as set forth in claim 15 wherein said valve plug is a baffle.

18. In a modulating fluid control device for a fluid-based heating and cooling system for a measured environment, the device comprising a valve body, a fluid entry port and a fluid exit port and a valve with actuator located between the ports, the valve responsive to input from a thermostat to restrict or permit the flow of fluid through the valve dependent upon conditions in the measured environment, the improvement characterized in that the control device is provided with:
   a valve controller and means associated therewith to position the valve and thereby regulate the flow of fluid through that valve;
   flow detection means associated with the valve to measure the flow of fluid at a location in the system and provide to the valve controller a feedback signal representative of that flow rate; and
   a pair of temperature sensors, a first one of the sensors positioned to measure the temperature of the fluid passing through the device to a heat exchanger and a second of the sensors positioned to measure the temperature of fluid returning from the heat exchanger, each sensor to provide a microprocessor in the valve controller or within a remote building automation system a signal representative of the temperature of the fluid at the respective sensor location and the flow detection means to provide a signal of the fluid rate of flow,
the thermostat adapted to provide a signal to the valve controller and the valve controller arranged to control the valve, and so control the flow of fluid in the system responsive to signals received from the thermostat, the flow detection means and the microprocessor arranged to calculate the BTU gain or loss in the fluid between the sensors and control the valve to provide a desired flow of BTU's responsive to those calculations and/or tabulate the BTU's for billing or monitoring purposes.

19. In a modulating fluid control device for a fluid-based heating and cooling system for a measured environment, the device comprising a valve body, a fluid entry port and a fluid exit port and a valve with actuator located between the ports, the valve responsive to input from a thermostat to restrict or permit the flow of fluid through the valve dependent upon conditions in the measured environment, the improvement characterized in that the control device is provided with:
   a valve controller and means associated therewith to position the valve and thereby regulate the flow of fluid through said valve;
   flow detection means associated with the valve to measure the flow of fluid at a location in the system and provide to the valve controller a feedback signal representative of that flow rate; and
   a pair of temperature sensors, a first one of the sensors positioned to measure the temperature of the fluid passing through the device to a heat exchanger and a second of the sensors positioned to measure the temperature of the fluid returning from the heat exchanger
the thermostat adapted to provide signals to the valve controller and the valve controller arranged to control the valve, and so control the flow of fluid in the system responsive to signals received from the thermostat, the flow detection means and the valve controller arranged to maintain a maximum required rate of flow of fluid through the system as measured by the flow detection means for fluid balancing of the system, and each of the temperature sensors arranged to provide to the valve controller a signal representative of the temperature of the fluid at the respective sensor loctioan, the valve controller arranged to calculate the BTU gain or loss in the fluid between the temperature sensors and the flow of detection means, and control the valve to provide a desired flow of BTU's responsive to those calculations.

20. A fluid control device according to claim 19 wherein the valve controller contains a programmable integrated controller (PIC) programmed to control the positioning of the valve responsive to signals received from the thermostat and the flow detection means to maintain the required rate of flow of fluid through the system and to calculate the BTU gain or loss in the fluid between the sensors and control the valve to provide a desired flow of BTU's responsive to those calculations while monitoring and totalizing BTU's for billing and efficiency.

21. A flow control device according to claim 19 wherein the valve controller is a computer means positioned remotely from the valve and the valve body, the computer means programmed to control the positioning of the valve responsive to signals received from the thermostat and the flow detection means to maintain the required rate of flow of fluid through the system and to calculate the BTU gain or loss in the fluid between the sensors and control valve to provide a desired flow of BTU's responsive to those calculations while monitoring and totalizing BTU's for billing and efficiency.

* * * * *